Oct. 22, 1940. J. BORGE 2,218,635

DIFFUSER

Filed Dec. 4, 1939

INVENTOR.
Johan Borge
By Parker, Brockwell & Farmer
ATTORNEYS.

Patented Oct. 22, 1940

2,218,635

UNITED STATES PATENT OFFICE 2,218,635

DIFFUSER

Johan Borge, Bellport, N. Y., assignor to Electro-Refractories & Alloys Corporation, Buffalo, N. Y.

Application December 4, 1939, Serial No. 307,419

5 Claims. (Cl. 261—122)

This invention relates to diffusers of the kind commonly employed for supplying gas such as air to a liquid. Diffusers of this type are, for example, commonly used for supplying air to water in connection with the purification thereof and to sewage during the treatment of the same.

One of the objects of this invention is to provide a diffuser of improved and simplified construction by means of which a large amount of gas per unit of area of the distributor may be discharged through the liquid. A further object of this invention is to provide a diffuser which is so constructed that it can readily be moved into and out of its operative position without interfering with the sewage treatment process. A further object is to provide a diffuser in which the porous or diffusing element is of improved shape which provides a large surface exposed to the liquid and which prevents the accumulation of solid material thereon. A further object is to provide a diffuser of improved form in which the porous material is protected against breakage.

Other objects of this invention will appear from the following description and claims.

Figure 1:
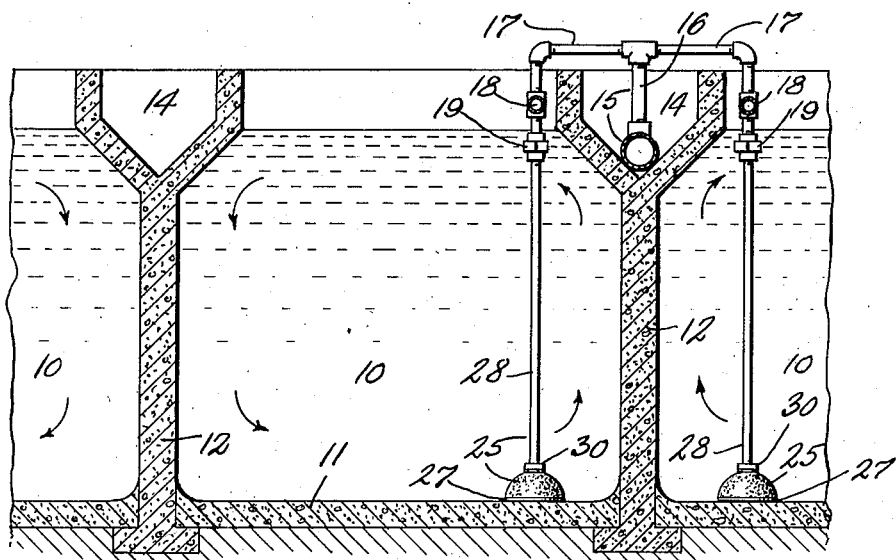
Fig. 1 is a cross sectional view of a portion of an aeration tank equipped with diffusers embodying this invention.
Figure 2:
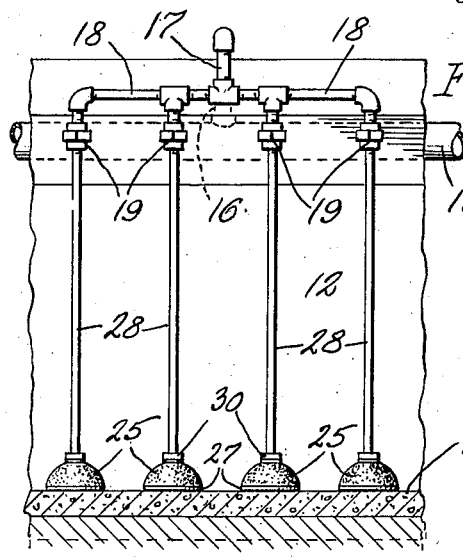
Fig. 2 is a fragmentary longitudinal section thereof, showing a plurality of diffusers embodying this invention.

In Figs. 1 and 2, an aeration tank is shown having a plurality of flow chambers 10 each provided with a bottom 11. 12 represents upright walls separating several flow chambers of the tank. The upper portions of these walls may be of substantially trough shape forming spaces 14 for air pipes or other parts that may be necessary for the treatment of liquid. In one of these spaces 14 is shown a main air pipe or duct 15, which may be provided at intervals with branch pipes 16 extending upwardly from the main pipe 15. Each branch pipe is connected with a laterally extending pipe 17 conducting air or other gas to each side of the upright wall 12. These pipes may in turn connect with longitudinally extending pipes 18 having a plurality of downwardly extending nipples or connections provided at their lower ends with suitable couplings 19 to which the diffuser units may be connected. The tank and pipe connections are shown merely by way of example to illustrate the manner in which my improved diffusers may be used, but it will be understood that diffusers embodying this invention may be used with tanks and pipe connections of other construction. Suitable valves (not shown) may, of course, be used in the piping connections wherever desired to shut off the supply of gas to one or more diffusers.

It is, of course, necessary in connection with the treatment of liquid to supply an ample quantity of air to the sewage or water, and consequently, it is desirable to remove the diffusers from the tank at intervals of time for inspection, cleaning, repair, or replacement. For this purpose, I prefer to construct the diffusers in such a way that they may be readily removed from the treatment tanks, and it is, furthermore, desirable that this be done without interrupting the treatment of the liquid.

Figure 3:
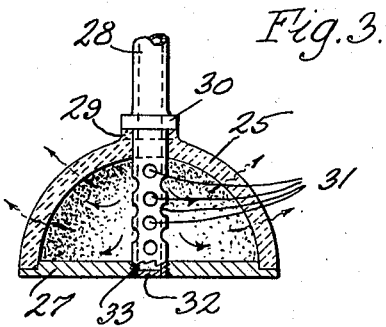
Fig. 3 is a central sectional elevation of a diffuser embodying this invention.

With these objects in mind, I have provided a diffuser which includes a hollow dome-shaped or substantially hemispherical concavo-convex porous element 25, which is preferably made of ceramic or carbonaceous material of the desired porosity. This diffusing element or member has an open lower end which is closed by means of a substantially impervious or non-porous base member, such as a plate or disk 27, which is preferably made of metal, and in the particular construction shown in Figs. 1 to 3, I have employed a conduit or duct 28 which serves the purpose of forming a connection between the porous member and the bottom plate, as well as supplying gas, such as air, to the interior of the diffuser. This conduit is preferably in the form of a metal pipe and thus also forms a handle by means of which the diffuser may be moved into and out of its operative position. For this purpose, I provide the porous element or body 25 of the diffuser in the upper portion thereof with a central aperture or hole through which the pipe 28 may pass, and I preferably also reinforce the portion of the porous element about the hole by forming thereon an enlargement or boss 29. I preferably also provide on the pipe 28 a collar 30 suitably secured thereon, and which may bear against the upper face of the porous member 25 about the hole or opening therein. The portion of the pipe 28 below the collar 30 extends into the diffuser and is preferably provided with a plurality of apertures 31 through which gas may pass into the interior of the diffuser. The lower end of the tube may be closed in any suitable manner, for example, by means of a plug 32 and this end of the pipe is suitably secured to the base member 27 in any suitable or desired manner. In the construction shown for this purpose, the lower end of the pipe 28 is threaded, as indicated at 33, and engages corresponding threads formed in the base plate 27, for example, in a central aperture formed therein. Consequently, by turning the pipe 28 relatively to the base member 27, the pipe may be secured to the base plate and clamps the ceramic or porous member 25 between this plate and the collar 30. This construction, consequently, protects the porous member 25 against breakage and strains and also forms a very efficient connection between the pipe and the diffuser. The upper end of the pipe 28 is formed to cooperate with any of the coupling members 19 so that the diffuser may receive air from the main pipe 15 through the various branch pipes which have been described.

Figure 5:
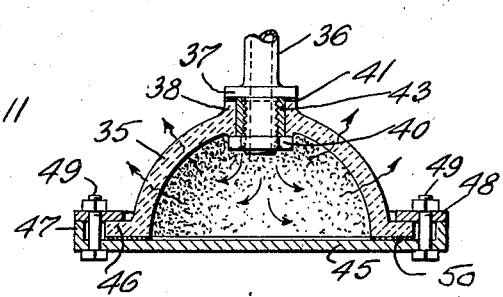
Fig. 5 is a central sectional elevation of a diffuser of modified construction.
Figure 4:
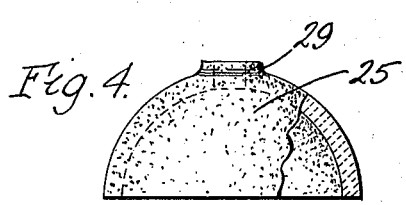
Fig. 4 is a side elevation, partly in section, of the ceramic or air diffusing elements of a diffuser.

In Fig. 5 is shown a modified form of diffuser having a hollow dome-shaped or substantially hemispherical porous member 35 also provided with a central aperture through which a pipe or duct 36 extends. In this construction, the pipe 36 is provided with a collar 37 engaging an enlarged hub portion 38 of the porous member formed about the aperture therein and the pipe 36 is secured directly to the porous member 35, this being done in the construction shown by means of a nut 40 secured to the threaded lower end of the pipe 36 and engaging the underface of the hub portion 38 of the porous member. In this drawing, a packing washer or gasket 41 is shown between the upper end of the hub 38 and the collar 37, and in order to prevent crushing or placing excessive strain upon the porous member, a metal sleeve 43 is preferably provided within the aperture and around the portion of the pipe 36 which extends through the aperture in the porous member. This sleeve or tube 43 limits the extent to which the nut 40 may be moved toward the collar 37, and thus prevents damage to the hub portion 38 of the porous member. Any other means for connecting the pipe 36 with the porous member 35 may, of course, be employed, if desired.

In order to close the open lower end of the porous member 35, a substantially non-porous closure member 45, which may also be in the form of a metal plate, is provided which may be secured to the porous body member in any suitable or desired manner. In the particular construction shown for this purpose, the porous body is provided at the lower edge thereof with an outwardly extending annular flange 46 which extends substantially parallel to the plate 45 and this plate is also provided with an annular upwardly extending flange 47 at its periphery. A clamping ring or member 48 is provided which engages the upper surfaces of the flanges 46 and 47. A series of clamping bolts 49 extending through the ring 48 and the base plate 45 press the clamping member against the upper faces of the flanges 46 and 47 and thus secure the porous member to the base plate 45. Preferably a washer 50 of rubber or other flexible material is employed between the lower end of the porous member and the base plate 45 to form a substantially air-tight connection between these parts, so that all or most of the air will be forced to pass through the pores of the member 35.

In the use of my diffusers, it will be obvious that when the same are connected to a gas supply system, as shown in Figs. 1 and 2, gas, such as air, will be forced outwardly through the porous dome-shaped or substantially hemispherical walls of the diffuser. This air will be discharged from the porous element of the diffuser in various different directions, the air passing through the body portion of the diffuser being projected practically horizontally and the air discharged near the upper portion of the diffuser being discharged substantially vertically and upwardly, while air discharged from intermediate portions of the diffuser will be projected in various directions intermediate of the two mentioned. Consequently, the air will be distributed through a materially greater space or volume of liquid by means of the dome-shaped or hemispherical diffuser shown, than would be in the case of a flat horizontal diffuser, in which the air would all pass vertically upwardly, or in the case of a cylindrical diffuser in which the air is all discharged substantially horizontally. My diffusers, therefore, aerate the liquid very effectively.

Furthermore, the shape of the diffusers is such that solid material precipitating out of the liquid will not tend to lodge upon the diffusers, and thus interfere with the discharge of air therefrom, but will tend to move downwardly along the sloping sides of the porous elements or members of the diffusers. The hemispherical or dome-shape of the diffusers also has the advantage that they have approximately one and one-half times as much area through which gas can be passed as have flat plates occupying approximately the same floor area. It is, consequently, possible in the use of these diffusers, to employ a smaller number of these improved diffusers than would be necessary if flat diffuser plates were employed, or if the same number of diffusers is employed, more air can be supplied to the liquid.

The diffusers may be arranged in the liquid in any suitable manner. In the construction illustrated in Fig. 2, they are arranged in groups of four, but obviously any number of diffusers may be arranged in a group, or each diffuser may be connected to the air pipes independently of the others. The diffusers are formed in relatively small units, and consequently, any diffuser can be readily and quickly removed from the treating tank without interfering with the treatment of the sewage or other liquid.

The metal base plates reinforce and protect the lower open ends of the porous elements so as to reduce materially the chance of damage to the diffusers by lowering the same to the bottom of the liquid tank. Diffusers of the construction shown in Figs. 1 to 4 have the further advantage that if the porous member or element becomes broken, it is merely necessary to disconnect the pipe 28 from the base plate 27, whereupon another porous member may be placed into operative relation to these parts of the diffuser.

I claim as my invention:

1. A diffuser comprising a concavo-convex body of a porous rigid material having an open bottom and having a central aperture extending through said body, a metal plate removably secured to said bottom of said body for closing said hollow body and for reinforcing the same, and a rigid pipe extending through said central aperture into said hollow body to admit gas thereto and removably secured to said diffuser, means for supplying gas to said pipe, and a detachable connection between said means and the upper end of said pipe, whereby said diffuser may be readily disconnected and removed from said supply means and from the liquid to repair the same and to replace said porous body.

2. A diffuser comprising a concavo-convex body of porous rigid material having an open bottom, a rigid base member of substantially impervious material closing said open bottom of said body, said body having an aperture in the middle portion thereof, a conduit extending through said opening and closing the same and secured to said base member and having an opening in the space between said base member and said body for discharging gas into said space.

3. A diffuser comprising a concavo-convex body of porous rigid material having an open bottom, a rigid base member of substantially impervious material closing said open bottom of said body, said body having an aperture in the middle portion thereof, a conduit extending through said opening and closing the same and having a part engaging said body and another part engaging said base member for securing said body to said base member, and having an opening in the space between said body and said base member through which gas may be discharged in said space.

4. A diffuser comprising a concavo-convex body of porous rigid material having an open bottom, a rigid base member of substantially impervious material closing said open bottom of said body, said body having an aperture in the middle portion thereof, a conduit extending through said opening and closing the same, a collar secured to said conduit and engaging the upper face of said body about said aperture, the lower end of said conduit having a threaded portion adapted to engage a correspondingly threaded portion in said base member for drawing said body into engagement with said base member, said conduit having an aperture in the space between said body and said base member for admitting gas into said space.

5. A diffuser comprising a concavo-convex body of porous rigid material having an open bottom and provided with an outwardly extending flange on a lower portion thereof, a plate of substantially impervious material arranged to close said open bottom, means for clamping said plate to said flange to secure said plate in its operative position, said body having a substantially centrally disposed aperture extending through the upper portion thereof, a pipe for conducting gas to the interior of said hollow body and extending through said aperture, and means on said pipe engaging said hollow body about the opposite ends of said aperture for securing said pipe to said body.

JOHAN BORGE.